United States Patent [19]

Grant et al.

[11] 3,839,627
[45] Oct. 1, 1974

[54] MULTI-MODE DIGITAL CONTROL APPARATUS

[75] Inventors: Arthur F. Grant; Donald O'Malley, both of Pittsburgh, Pa.

[73] Assignee: Bacharach Instrument Company, Pittsburgh, Pa.

[22] Filed: Dec. 3, 1973

[21] Appl. No.: 421,075

[52] U.S. Cl............. 235/151.3, 73/119 A, 73/168, 235/92 MT
[51] Int. Cl....................... G01m 15/00, G06f 7/38
[58] Field of Search....... 235/151.3, 151.34, 92 MT, 235/92 FL; 73/119 A, 119 R, 168, 117.2, 116

[56] References Cited
UNITED STATES PATENTS

| | | | |
|---|---|---|---|
| 3,347,093 | 10/1967 | Hauck................................. | 73/168 |
| 3,514,995 | 6/1970 | Dobson....................... | 73/194 R X |
| 3,577,776 | 5/1971 | Brown, Jr. ........................ | 73/119 A |
| 3,779,457 | 12/1973 | Cornyn, Jr. et al............... | 73/168 X |

*Primary Examiner*—Malcolm A. Morrison
*Assistant Examiner*—Edward J. Wise
*Attorney, Agent, or Firm*—Parmelee, Miller, Welsh & Kratz

[57] ABSTRACT

Apparatus for testing fuel injection equipment includes a hydrostatic transmission controlled by a multi-mode digital controller. The controller has a tachometer mode, a count mode, in which the volumetric output of each fuel injector is checked automatically for a preset number of revolutions, and a speed control mode. The speed control mode which generates continuous speed error signals for large speed errors and pulse speed error signals for small deviations, rapidly and accurately sets the speed for each test.

16 Claims, 3 Drawing Figures

સ3,839,627

MULTI-MODE DIGITAL CONTROL APPARATUS

FIELD OF INVENTION

This invention relates to apparatus for testing fuel injection equipment and more particularly, to devices for monitoring and controlling the speed and the output of said equipment.

PRIOR ART

When building or repairing fuel injection equipment such as fuel pumps for diesel engines, the completed pump must be calibrated to insure proper fuel metering. Diesel fuel pumps must be calibrated both at very low rpms to assure that proper fuel is delivered for starting and at very high rpms to check the operation of the governors. Checks are also usually made in the intermediate ranges. Thus, there is a requirement in the test equipment for control of the speed of rotation of fuel pump over a wide range. One of the factors affecting the accuracy of the calibration is the precision with which the speed is controlled during the tests.

Heretofore, the deisel fuel pump has been driven during testing by an electric motor through a variable ratio pulley drive. Such an arrangement does lend itself to quick precise changes in speed and is subject to droop as the load changes. This, coupled with the fact that selsyn type tachometers used with the equipment are only accurate within ±5 rpm, calibration was time consuming and not as accurate as might be desirable.

SUMMARY OF THE INVENTION

According to the invention, plural injector fuel injection equipment is tested over a wide range of speeds by driving it through a hydrostatic transmission under control of multi-mode digital control apparatus. The control apparatus includes a tachometer mode in which pulses generated as a function of shaft rotation are accumulated for predetermined intervals with the accumulated count presented on digital display apparatus, a count mode in which the pulses are accumulated until a predetermined count indicative of a preset number of revolutions is reached and a speed control mode which compares the number of pulses generated in a preselected interval with a preselected count and generates speed error signals as a function of the difference between the two. In conducting tests, the speed is set with the controller in the speed control mode. Control is then switched to the count mode which opens valves to divert the fuel from each injector into a separate receptacle, preferably a graduate. At the completion of a preset number of revolutions, when the accumulated count reaches a preset count, flow to the receptacles is automatically terminated. By dividing the pulses generated by the number of pulses generated per revolution of the output shaft of the transmission, the accumulated count in the count mode is a direct count of the revolution turned, which may be visually displayed.

In controlling the speed of the hydrostatic transmission, the pulses generated by shaft rotation are accumulated for predetermined intervals and compared with a preselected count. If the difference exceeds a first count, a continuous speed error signal is generated which quickly drives the system toward the desired speed. When the difference is less than the first count, a pulse error signal is generated to make the fine adjustment. In the preferred embodiment, the preselected count is loaded into the counter before each timing interval. The counter then counts the pulses in the down direction and, if a count of zero is reached, reverses direction and counts up. Pulses are applied to an additional counter each time the count in the first counter reaches the first count while counting in either direction and each time a second count, which is less than the first count, is reached while counting in either direction. If the count accumulated in the additional counter during a preselected interval is zero, a continuous speed increase signal is generated. If the accumulated count is 1, a pulse signal tending to increase the speed is generated for each interval. When the count is 2, no control action is taken, while an accumulated count of 3 produces a pulsed speed decrease signal, and a count of 4 generates a continuous speed decrease signal.

BRIEF DESCRIPTION OF THE DRAWINGS

An understanding of the invention can be obtained from the following description when read in conjunction with the attached drawings, in which like reference characters refer to like parts in all of the views, and.

DESCRIPTION OF THE PREFERRED EMBODIMENT

Figure 1:
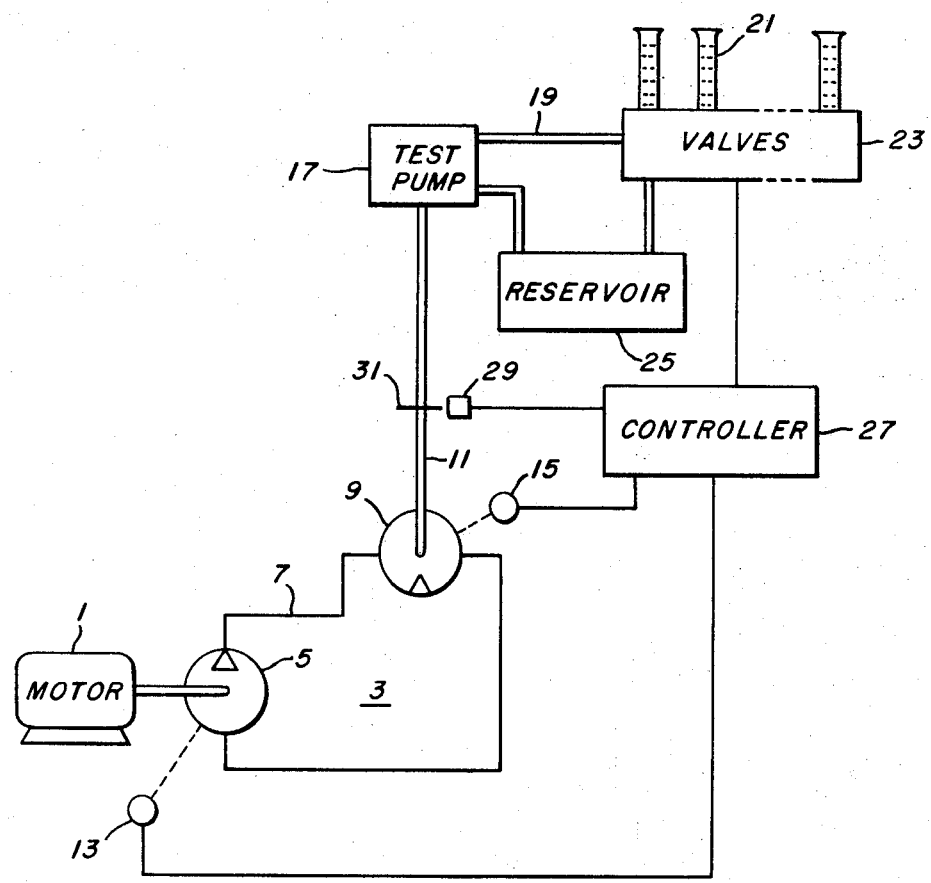
FIG. 1 is a schematic diamgram of diesel fuel pump test equipment incorporating the invention.

Referring to FIG. 1 an a-c induction motor 1 is used to drive a hydrostatic transmission identified by the general reference character 3. The hydrostatic transmission comprises a variable displacement pump 5 driven by the motor 1 which supplies hydraulic fluid under pressure in a closed loop 7 to a hydraulic motor 9 which in turn drives the output shaft 11. In the exemplary embodiment of the invention, the hydraulic motor 9 is a variable displacement motor although a fixed displacement hydraulic motor may also be utilized. With the hydraulic pump driven at a constant rpm by the a-c induction motor, the speed of the output shaft 11 is varied by adjusting the displacement of the hydraulic pump and the hydraulic motor, through servo motors 13 and 15 respectively, in a manner to be more fully discussed below.

The output shaft 11 drives the fuel pump 17 to be tested. The apparatus is adaptable for testing either single or multi-plunger fuel injection equipment. Such equipment is provided with a fuel injector for each cylinder in the diesel equipment served by the pump. When the pressure supplied by the pump to the individual injectors reaches a preset value, the injector opens and remains open until the pressure again drops below the preset value.

In order to assure that the proper amount of fuel is being metered, the injectors are individually connected through lines shown collectively as 19 to graduates 21. A set of valves 23 includes fill valves which direct the pressurized fuel either to the graduates or to the fuel reservoir 25, and drain valves which empty the fuel from the graduates after the fluid has been measured.

In running tests, the pump is driven at several predetermined speeds. For each speed, the fill valves are opened and the fuel from each injector collects in its individual graduate for a preset number of revolutions of the pump. The speed of the pump and the opening and closing of the valves is controlled by the controller 27. Pump shaft rotation data is obtained for the controller in the form of a pulse signal. Any one of a number of known means for generating a pulse signal representative of shaft rotation can be employed. In the exemplary embodiment, an inductance pickup 29 is placed in close proximity to a toothed wheel connected for rotation with the shaft. The wheel is provided with 300 teeth such that 300 pulses are generated per shaft revolution. Speed is controlled through servo motors 13 and 15 which vary the displacement of the hydraulic pumps 3 and the hydraulic motor 9, respectively, in the hydrostatic transmission and DECREASE speed error signals in response to INCREASE.

Figure 2:
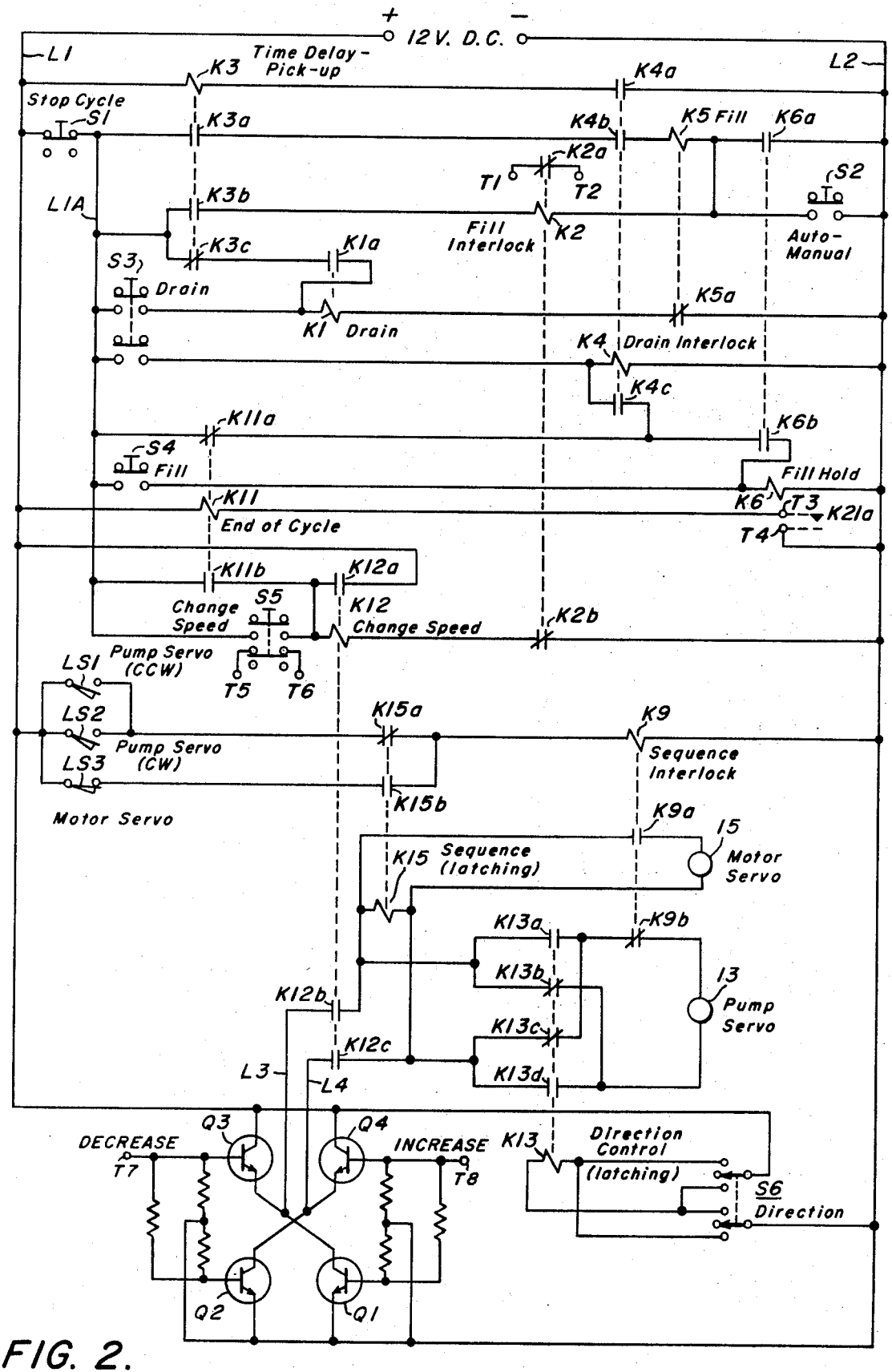
FIG. 2 is a schematic diagram of a portion of a control circuit for the equipment of FIG. 1.
Figure 3:
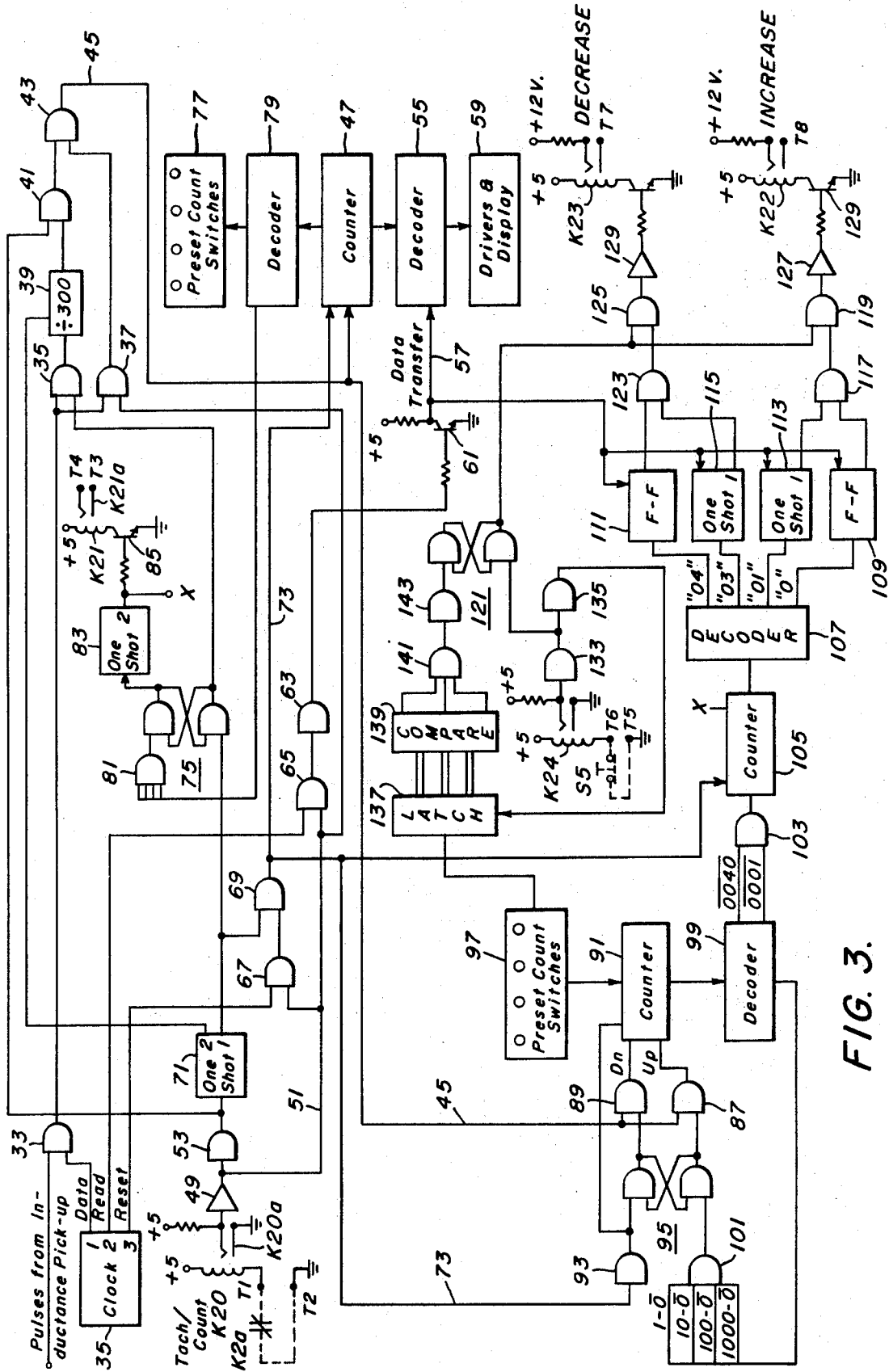
FIG. 3 is a schematic diagram of another portion of the control circuit for the equipment of FIG. 1.

The control circuitry is illustrated in more detail in FIGS. 2 and 3. The relay circuitry and servo motors are powered by 12 volts d-c applied between positive and negative buses L1 and L2 as shown in FIG. 2. In this figure, the relay coils are identified by the letter K followed by a numeral and the associated contacts are identified by the same identifier supplemented with a lower case letter. The contacts are all shown in the condition they assume when the relay coil is unenergized as is conventional.

With power applied across the buses L1 and L2, the TIME DELAY relay K3 picks up a predetermined time after it is energized through the make contacts K4a of the DRAIN INTERLOCK relay K4. A two-position alternate action STOP CYCLE switch S1 supplies power to an auxilliary bus L1A. The FILL relay K5 is energized through make contacts K3a and K4b of the TIME DELAY and DRAIN INTERLOCK relays, and either the make contacts K6a of the FILL HOLD relay 6 or the two-position alternate action AUTO-MANUAL switch S2. The FILL INTERLOCK relay K2 is also energized through the contacts K6a or switch S2 in addition to make contacts K3b of the TIME DELAY relay. Upon pickup, K2 opens the make contacts K2a which are connected between terminals T1 and T2 in the digital circuitry illustrated in FIG. 3 and disables the CHANGE SPEED relay K12.

A double throw momentary action DRAIN switch S3 energizes DRAIN relay K1 and DRAIN INTERLOCK relay K4 which remain energized through holding contacts K1a and K4c, respectively. Another momentary action switch, the FILL switch S4, picks up the FILL HOLD relay K6 which seals in through holding contacts K6b.

An END OF CYCLE relay K11 is energized through contacts K21a of reed relay K21 connected between terminals T3 and T4 in the digital circuitry of FIG. 3. These contacts close to pick up K11 at the end of the test cycle when the pump has turned the predetermined number of revolutions. The CHANGE SPEED relay k12 is picked up through the double throw momentary action CHANGE SPEED switch S5 and seals in through holding contacts K12a. Contacts K2b of the FILL INTERLOCK relay prevent pick up of the CHANGE SPEED relay during the fill cycle. The switch S5 also completes a circuit between the terminals T5 and T6 in the digital circuitry of FIG. 3.

The lower part of FIG. 2 relates to the speed control circuitry. As mentioned above, the speed of the fuel pump being tested is controlled by varying the displacement of the hydraulic pump and the hydraulic motor in the hydrostatic transmission. The hydraulic pump is an overcenter type such that the direction of flow of the pressurized fluid to the hydraulic motor may be reversed to permit rotation of the output shaft in either direction. At zero speed, the hydraulic pump is in the neutral position and the hydraulic motor is set for maximum displacement. The speed is controlled in the lower ranges by the servo 13 which varies the displacement of the hydraulic pump. When full displacement is reached on the pump in either direction, further increases in speed are effected by varying the displacement of the hydraulic motor through the servo 15.

Referring to FIG. 2, the SEQUENCY INTERLOCK relay K9 may be energized through contacts of the SEQUENCY relay 15 and either limit switches LS1 or LS2 which close when the pump servo 13 has driven to the full counter clockwise or clockwise position, respectively establishing full displacement on the hydraulic pump. It may also be energized through limit switch LS3 which is closed when the motor servo 15 is not in the position to set the hydraulic motor for full displacement, e.g. in the higher speed ranges. The relay K9 determines through contacts K9a and K9b whether the speed INCREASE or DECREASE signals appearing across the buses L3 and L4, when the make contacts K12b and K12c of the CHANGE SPEED relay are closed, are applied to the pump servo 13 or the motor servo 15.

The SEQUENCE relay 15 is also energized by the buses L3 and L4. This is a latching relay which picks up when the polarity of the signal across buses L3 and L4 is such that it drives the servos in a direction which reduces speed. The relay remains picked up until the polarity on L3 and L4 reverses. The DIRECTION CONTROL relay K13 is also a latching relay which is picked up or dropped out through the double throw three position DIRECTION switch S6. Contacts of relay K13 determine and store the direction of rotation of the transmission by establishing the sense in which the INCREASE and DECREASE speed error signals are applied to the pump servo 13.

The switching circuitry by which the DECREASE and INCREASE speed error signals generated in the circuits of FIG. 3 are applied to the buses L3 and L4 is illustrated in the lower left portion of FIG. 2. Included are four N-p-n transistors such as type 2N3055. The transistors are operated in pairs with Q2 and Q3 under control of the DECREASE speed error signal applied to terminal T7, and Q1 and Q4 under control of the INCREASE speed error signal applied to terminal T8. The DECREASE speed error signal is a digital signal which drives both Q2 and Q3 into saturation thereby raising the potential on L3 to substantially the potential on L1 through Q3 and pulling L4 down to the potential on L2 through Q2. On the otherhand, the INCREASE speed error signal applied to the bases of Q1 and Q4 drives these transistor into saturation which reverses the polarity on L3 and L4 by raising the potential of L4 to substantially that on L1 and through Q4 and by pulling L3 down to substantially the potential on L2 through Q1. As will be discussed fully in connection with FIG. 3, the INCREASE and DECREASE speed error signals may be either pulse signals or continuous signals.

FIG. 3 illustrates the digital portion of the controller circuitry and utilizes NAND logic. NAND logic elements, such as element 33, are well known logic circuits which generate a digital ONE output signal unless digital ONE signals are applied to all of the inputs, in which case a digital ZERO signal appears at the output. FIG. 3 also includes a number of other logic blocks which perform specified logic functions. Many of these logic blocks are available in the form of standardized TTL (transistor to transistor logic) integrated circuits in which case the industry standard numerical designation for a suitable integrated circuit is provided.

Shaft rotation data in the form of a pulse signal from the inductance pick up which has been shaped and filtered (not shown) is applied to NAND gate 33. The gate 33 is enabled by a signal from the digital clock 35. Digital clocks are well known and it is within the skill of digital circuit designers to design a circuit which will generate the timing signals required for a particular application. The clock used here is designed to generate a basic interval of 0.2 seconds. Thus a digital ONE signal lasting 0.2 seconds is generated repetitively at the DATA output of the clock 35. The DATA signal is followed by a READ signal which appears at the READ output of the clock. The READ signal is normally a digital ONE but goes to ZERO during the read interval. The READ signal is followed by a RESET signal which appears as a digital ONE at the RESET output of the clock. This signal resets the digital circuitry for the next DATA interval. The total turning interval including the data read and reset intervals is 0.20001 seconds.

The DATA signal from the clock 35 enables gate 33 for 0.2 second intervals to apply the data pulses from the inductance pick up to NANDs 35 and 37. If NAND 37 is enabled, the pulses pass through gate 43 and are applied through lead 45 to a digital counter 47 which may comprise four serially connected 7,490 integrated circuits. On the other hand, if the gate 35 is enabled, the data pulses are divided by 300 in the count divider 39 comprising three serially connected 7,490 integrated circuits before being applied to the counter 47 through gates 41 and 43 and lead 45.

The gates 35, 37 and 41 are controlled by the mode selection circuitry which, in turn, is controlled by signals from the relay circuitry of FIG. 2. With the contacts K2a of the FILL INTERLOCK relay K2 closed, the TACH/COUNT relay K20 is energized to place the digital circuitry in the tachometer mode. In this mode the contacts K20a of relay K20 are closed to apply a digital ZERO signal to the input buffer 49, which generates a ONE signal on lead 51 to enable gate 37 and disable the gate 41 through NAND 53. Thus, in the tachometer mode, all pulses generated by the inductance pick up during the 0.2 second interval are applied to the counter 47.

The digital count in counter 47 is decoded by a four-decade decimal decoder 55. The decoder comprises four 7475 integrated circuits provided with latches which store the decoded count accumulated in counter 47 when a DATA TRANSFER signal is applied through lead 57. The decoded count stored in the latches is applied to a read out device 59, which may include drivers such as DD700 integrated circuits and a four-decade digital display device such as two, two digit Sperry SP752 seven segment displays.

Updating of the count stored in the latches of decoder 55 is controlled by a transistor 61. When transistor 61 is turned "off," a 5volt DATA TRANSFER signal is applied to the decoder through lead 57 to lead the decoded accumulated count into the latches. The transistor 61 is biased "off" and "on" by the NAND 63 which, in turn, is controlled by the gate 65. Gate 65 is enabled in the tachometer mode by the ONE signal on lead 51. Thus during the 0.2 second data interval, the ONE signal generated at the READ output of the clock causes the output of gate 65 to go to ZERO. This ZERO signal produces a ONE at the output of NAND 63 which biases transistor 61 "on" to ground lead 57 and prevent any change in the count stored in decoder 55. During the read interval, the READ signal from the clock goes to ZERO to bias transistor 61 "off," thereby updating the count stored in the latches. Following the READ signal, the RESET signal is applied by the clock to gate 67 which is enabled in the tachometer mode by the signal on lead 51. The ZERO signal thus generated is applied to another gate 69, enabled in this mode by a one-shot multivibrator 71, to generate a reset pulse on lead 73 which resets the counter 47 to zero. Thus in the tachometer mode, the counter 47 counts the number of pulses generated by the inductance pick up in each 0.2 second interval and the accumulated count is stored in the decoder 55 for display during the next 0.2 second interval by the display device 59.

When the contacts K2a of the FILL INTERLOCK relay are opened, the digital circuitry is transferred to the count mode. In this mode, the contacts K20a of the TACH/COUNT relay are opened to generate a digital ZERO signal on lead 51 which disables gate 37 and generates a digital ONE signal at the output of NAND 53. This latter signal enables the gate 41 and energizes one shot multi-vibrator 71. In the exemplary embodiment, the one shot 71 is a 74121 integrated circuit which generates complementary output pulse signals in response to an input signal. The signal at output number 1is normally a ONE, but goes to ZERO upon the onset of the applied signal and remains ZERO for a preselected interval, which is independent of the continuation or termination of the input signal. The output 2 is complementary in that it is normally ZERO but goes to ONE for the preselected interval. When one shot 71 is triggered, the number 2 output resets the count divider 39 to zero and the number 1 output resets an R-S flip-flop 75 to enable gate 35. Thus in the count mode, gate 37 is disabled and gates 35, 41 and 43 are enabled (the latter by disabled gate 37) such that every 300th pulse generated by the inductance pick up is applied to the counter 47.

The ZERO signal generated on lead 51 in the count mode disables gate 65 to maintain transistor 61 in the "off" state so that the instantaneous count accumulated in counter 47 is continuously displayed in the readout device 59. Simultaneously, the accumulated count in counter 47 is continuously compared decade by decade with a preset decimal count manually inserted in a four digit digiswitch 77 through a decimal decoder 79 comprising four 7442 integrated circuits. When the accumulated count is counter 47 reaches the preset four digit decimal count, as determined by the digiswitches, the flip-flop 75 is set through NAND 81. The setting of flip-flop 75 disables gate 35 to stop the count and triggers a one shot multi-vibrator 83 similar to one shot 71. The pulse thus generated at the number 2 output of one shot 83 biases a transistor 85 "on" to pick up reed relay K21. Closing of the contacts K21a completes a circuit through terminals T3 and T4 in FIG. 2 to energize the END OF CYCLE relay. Thus, in the count mode, the number of revolutions turned is continuously displayed until a preset count is reached and the system automatically returns to the tachometer mode.

The data interval for the tachometer mode and the divisor of the count divider in the counter mode were selected to minimize the operations necessary to visually display the rpm and the number of revolutions respectively. By dividing the 300 pulses per revolution, generated by the inductance pickup by 300 in the count mode, the count of resultant pulses accumulated in counter 47 is a direct count of revolutions. Similarly, since 300 pulses are generated in one minute with the test pump driven at 1 rpm, 1 pulse is generated in one-threehundredth of a minute or 0.2 seconds and, therefore, the number of pulses accumulated in 0.2 second provides a direct reading of the rpm.

The digital circuitry of FIG. 3 also provides a speed control mode of operation. The pulses from the inductance pick up which are applied to the counter 47, are also applied through gate 87 or 89 to either the countup or countdown input, respectively, of up-down counter 91 comprising four serially connected 74192 integrated circuits. At the end of each timing interval in the tachometer mode, the reset signal appearing on line 73 is applied through NAND 93 to set an R-S flip-flop 95 which enables the count down gate 89. The reset signal also loads a count preset in a 4 decade digiswitch 97 into the reversible counter 91.

The data pulses appearing on lead 45 cause the counter 91 to count down from the preset count. If the counter 91 reaches zero before the end of the data interval, a decimal decoder 99 comprising four 7442 integral circuits generates output signals which reset flip-flop 95 through NAND 101 to disable the count down and enable the count up input of reversible counter 91. Thus, the counter 91 will count up for the remainder of the data interval.

The decoder 99 also produces output signals which go to ZERO when the count in counter 91 reaches 40 and 1 while counting in either direction. These negative pulses generate positive pulses through NAND 103 which are counted in counter 105 comprising a 7490 integrated circuit. The counter 105 is reset at the end of each timing interval in the tach mode by the reset signal on lead 73 and at the end of the count signal by the pulse generated by the one-shot 83 through a lead, not shown but indicated by the reference character x.

The count in counter 105 is decoded by decoder 107 which generates output signals on separate leads for counts of 0, 1, 3 and 4. The 0 and 4 leads are connected to flip-flops 109 and 111, respectively, while the 1 and 3 leads are connected to one-shot multivibrators 113 and 115, respectively. The one-shots are similar to one-shot 71 but are connected such that the number 1 output goes to ZERO momentarily only when a signal is applied to the input while a DATA TRANSFER pulse is applied through the lead 57 at the end of each timing interval. Similarly, the state of flip-flops 109 and 113 can only be changed when a DATA TRANSFER pulse is applied on lead 57.

The outputs of flip-flop 109 and one-shot 113 are applied through NAND 117 to a gate 119 which is enabled by an R-S flip-flop 121. Similarly, the outputs of one-shot 115 and flip-flop 111 are applied through NAND 123 to a gate 125 also enabled by flip-flop 121.

If the actual rpm is more than 40 rpm less than that called for by the digiswitch 97, no pulses are applied to the counter 105 during the 0.2 second data interval and, hence, the decoder 107 remains in the 0 state. Thus when the DATA TRANSFER pulse appears on lead 57, the output of flip-flop 109 will go to ZERO. This ZERO signal passes through gates 117 and 119 and is inverted by buffer 127 to supply base drive current to a transistor 129. With transistor 129 biased "on," the reed relay K22 is energized to generate an INCREASE speed error signal at terminal T8 which energizes the hydrostatic transmission servo motors in FIG. 2 to increase speed. The INCREASE speed error signal will be generated continuously by flip-flop 109 as long as counter 91 does not count down to 40 during a data interval.

When the speed increases sufficiently such that counter 91 counts down to 40 but not down to 1 during a data interval, the accumulated count in counter 105 will be 1. Thus, when the DATA TRANSFER signal is applied on lead 57, the 0 state of decoder 107 will be de-energized to reset the flip-flop 109, but the 1 state will now be energized to trigger one-shot 113 and generate an INCREASE speed error signal for the duration of the one-shot pulse. Pulse duration of the one-shot 113 is less than the timing interval such that when the actual speed is between 1 and 40 rpm less than desired speed, the servo motors on the hydrostatic transmission will be jogged to bring the transmission up to speed without overshoot.

If the actual speed is within 1 rpm of the desired speed, a count of two will be accumulated in counter 105 during the data interval. Since this state is not decoded, no control action is taken during the read interval.

When the actual speed exceeds the desired speed by more than 1 rpm, three pulses will be applied to counter 105 during the data interval, one each when counter 91 reaches 40 and 1 counting down and when it reaches 1 again counting up after its direction of counting is reversed. Under these conditions, the 3 state of decoder 107 will be energized to trigger one-shot 115 when the DATA TRANSFER pulse appears on lead 57. With gate 125 enabled by flip-flop 121, the negative pulse generated by the one-shot 115 will be inverted by buffer 129 to bias transistor 131 "on" and thereby generate a DECREASE speed error signal. Thus, when the speed differs from the desired speed by more than 40 rpm, a continuous speed correction signal is generated while a pulse speed correction signal is generated when the speed deviation is more than 1 but less than 40 rpm. The duration of the one-shots 113 and 115 may be adjusted to produce the desired rate of convergence for small deviations.

The speed mode is actuated by depressing momentary action switch 55 (see FIG. 2( connected between terminals T5 and T6 to de-energize the reed relay K24. This opens the contacts of relay K24 to generate a signal through NAND 133 which resets flip-flop 121 to enable the speed control relays K22 and K33 through gates 119 and 125. At the same time, a signal is applied through a NAND 135 to load the 1 bit data from the three most significant digits of the speed digiswitch 97 into a latch 137 which is a 7475 integrated circuit. The data stored in the latch is compared with the data from the switch in comparator 139 comprising a 7486 integrated circuit. If the 1000, 100 or 10 speed dial is shifted, the comparator generates through NANDs 141 and 143 a signal which changes the state of flip-flop 121 to disable the speed signal generating relays K22 and K23 through gates 119 and 125 until the CHANGE SPEED switch is again depressed.

OPERATION

A brief description of the typical operation of the system will aid in understanding the invention. When power is first applied, all of the relays in FIG. 2 remain de-energized. Initially, the operator will operate the DIRECTION switch S6 to one position or the other to set the direction of rotation of the output shaft of the hydrostatic transmission. It will be assumed that the polarity of the signal thus generated unlatches relay K13. Next, the operator sets the desired speed in digiswitch 97 and depresses the CHANGE SPEED switch S5. This energizes the SPEED relay K12, which seals itself in through contacts K12a enables buses L3 and L4 through contacts K12b and c. The CHANGE SPEED switch also completes a circuit through terminals T5 and T6 which enables gates 119 and 120 in speed control circuitry through the setting of flip-flop 121.

Since contacts K2a of the FILL INTERLOCK relay are closed at this point, the digital circuitry will be in the tachometer mode and hence the RESET signal generated by the clock 35 at the end of each timing interval will load the preset speed in digiswitch 97 into up-down counter 91 through the signal generated on lead 73. This signal will also set flip-flop 95 to prepare counter 91 to count down and will reset counter 105 to zero. However, since the pump is not rotating at this point, no data pulses are generated by the inductance pickup and the count in counter 191 will not decrease. As a result, no pulses are applied to the counter 105 during the data interval and this counter remains in the zero state. Thus, when the DATA TRANSFER signal from the clock generates a pulse on lead 57 at the conclusion of the DATA interval, flip-flop 109 will be set to generate an INCREASE speed error signal by energizing relay K22.

The INCREASE speed error signal generated at terminal T8 turns on transistors Q1 and Q4 in FIG. 2 to make bus L4 12 volts positive with respect to L3. Since the polarity of these buses unlatches the SEQUENCE relay K15, the SEQUENCE INTERLOCK relay K9 will be de-energized to apply the INCREASE speed error signal to the pump servo 13 through contacts K9b. The pump servo will alter the displacement of the hydraulic pump in the hydrostatic transmission to start the test pump rotating in the direction determined by the contacts K13b and c of the DIRECTION CONTROL relay.

As the output shaft of the hydrostatic transmission begins to turn, the data pulses generated by the inductance pickup are gated to the up-down counter 91 during the data intervals through gates 33, 37, 43 and 89. These data pulses are also gated to the counter 47. At the end of the DATA interval, the READ signal from clock 35 turns "off" transistor 61 to load the count accumulated in counter 45 into the latches of decoder 55 for display by the display device 59. Thus, as the test pump is accelerated toward the desired speed, the actual rpm is continuously displayed and updated every 0.2 seconds.

As long as the actual rpm remains more than 40 rpm below the preset speed, the INCREASE speed error signal will be continuously applied to the pump servo to increase the displacement of the hydraulic pump and thereby rapidly increase the rpm of the test pump. Assuming that the preset speed is in the higher ranges, one of the limit switches LS1 or LS2 will close when the servo 13 has driven the hydraulic pump to full displacement in the desired direction. With the contacts K15a of the SEQUENCE relay K15 closed, K9 will be energized to transfer the INCREASE speed error signal to the hydraulic motor servo 15 to further increase the speed of the test pump.

As the actual rpm approaches within 40 rpm of the desired speed, the up-down counter 91 in the speed control will apply 1 pulse to the counter 105 as it counts down through 40 during each data interval. Thus, the 1 output of decoder 107 will be energized to trigger one-shot 113 when the DATA TRANSFER signal appears on lead 57. The pulse generated by one-shot 113 will momentarily energize the speed increase relay K22 to generate a speed INCREASE pulse. Thus, a train of pulses will be applied to the appropriate servo to jog the hydrostatic transmission toward the final speed.

When the transmission is on speed, two pulses, one at a count of 40 and another at a count of 1, will be applied to counter 105 during each data interval. Since the 2 count is not decoded by decoder 107, no speed signals are applied to the servos and the speed remains constant. The actual speed will be continuously displayed by the display device 59.

With the speed set, the system is prepared for the test cycle by depressing the DRAIN switch S3 momentarily to pick up the DRAIN and DRAIN INTERLOCK relays K1 and K4 which are sealed in by holding contacts K1a and K4a, respectively. The relay K1 opens the drain valves to drain the fuel accumulated in the graduates. K4 energizes the TIME DELAY relay K3 which picks up after a preset interval to drop out K1 and close the drain valves. The time delay is sufficient to permit complete draining of the graduates.

When the drain cycle is complete, the FILL switch S4 may be depressed to begin the test cycle by picking up the FILL HOLD relay 6 which seals itself in through contacts K6b. The contacts K6a complete the circuits for energization of the FILL relay K5 and the FILL INTERLOCK relay K2. If it is desired that the fill cycle be initiated automatically upon completion of the drain cycle, the AUTO-MANUAL switch S2 may be actuated to short out the contacts K6a. The relay K5, when energized, opens the fill valves to divert the fuel from the fuel injectors into the graduates. K2 disables the CHANGE SPEED relay K12 to prevent any change in speed during the test cycle, and opens the contacts K2a to de-energize the TACH/COUNT relay K20 in FIG. 3 which transfers the digital circuitry to the count mode. Opening of the contacts K20a triggers the one-shot 71 which resets the count divider 39 to zero, resets the flip-flop 75, and resets counter 47 to zero to enable gate 35. With gate 35 enabled, the data pulses are divided by 300 in count divider 39 and the resultant pulses are counted in counter 47. The ZERO signal on lead 51 in the count mode prevents further resetting of the counter 47 and biases transistor 61 "off" to continuously apply the count accumulated in counter 47 to the display device 59. Thus, a visual presentation of the number of revolutions turned during the test cycle is continuously available in the count mode.

When the count accumulated in counter 47 reaches the desired count preset in digiswitch 77, flip-flop 75 is set to disable gate 35 and to trigger one-shot 83 which energizes reed relay K21 by biasing transistor 85 "on" for a 1 second interval. Closure of the contacts K21a picks up the END OF CYCLE relay K11 in FIG. 2 which drops the DRAIN INTERLOCK relay K4. This, in turn, de-energizes the FILL relay K5 to shut off the fill valves and terminate the flow of fuel from the injectors to the graduates, and drops the TIME DELAY relay K3. With K3 dropped out, the FILL INTERLOCK relay K2 is de-energized which opens contacts K2a and transfers the system back to the tachometer mode.

Since the output speed of the hydrostatic transmission is locked up in the count mode by the dropping out of the CHANGE SPEED relay K12, the speed for the next test can be set into the digiswitch 97 while the first test is running. Since the new speed set in the digiswitch will not agree with the previous speed stored in the latch 137, the flip-flop 121 will be set to disable the speed decrease and increase gates 119 and 125. These gates are re-enabled by drepressing the CHANGE SPEED switch S5 which resets flip-flop 121. This switch has no effect on the CHANGE SPEED relay K12 at this time since the contacts K2b of the FILL INTERLOCK relay are open. However, when the END OF CYCLE relay K11 picks up, K12 is re-energized through contacts K11b when K2 drops out and the buses L3 and L4 are reconnected to the servos to quickly and automatically effect the speed change.

Assuming that the new speed set in the digiswitch 97 is more than 40 r.p.m. less than the present speed, the counter 91 will count down to zero, reverse direction through resetting of flip-flop 95 by signals from the decoder 99 and count up past 40 during each DATA interval. In so doing, 4 pulses will be applied to counter 105 as the counter 91 passes through counts of 40 and 1 counting in each direction. Thus when the DATA TRANSFER signal appears on lead 57 during the read interval, the flip-flop 111 will be set by the 4 output of decoder 107 to continuously energize the decrease speed relay K23. The polarity of the DECREASE speed error signal thereby generated on the buses L3 and L4 is such that the SEQUENCE relay K15 is latched in. With the contacts K15b thus closed, the relay K9 will remain energized through limit switch LS3 and the motor servo 15 will be driven through contacts K9a in a direction to increase the displacement of the hydraulic motor and thus decrease the r.p.m. of the hydraulic motor and thus decrease the r.p.m. of the output shaft of the hydrostatic transmission. When the hydraulic motor reaches full displacement, limit switch LS3 will open to drop K9 and transfer the speed signals to the pump servo 13 through the break contacts K9b. As the r.p.m. decreases to between 40 and 1 r.p.m. more than the new command speed, three pulses will be applied to counter 105 during the data intervals to trigger the one shot 115 during each read interval thereby generating speed decrease pulses which will jog the transmission into the exact speed.

The disclosed apparatus is effective for conducting rapid and accurate tests on diesel fuel pumps. The hydrostatic transmission provides accurate speed control over the wide range of speeds required for conducting such tests. In addition, its stability permits the speed control circuitry to be disconnected and reset for the next test speed while one test is being conducted. In this manner, speed changes can be accomplished in a minimum of time. The rapidity of the speed changes is enhanced by the speed control circuitry which accurately brings the apparatus to the new speed without overshoot.

We claim:

1. Apparatus for testing plural injector fuel equipment driven through a rotating shaft, comprising:
   a motor;
   a hydrostatic transmission driven by the motor and having an output shaft adapted to be connected to the rotating shaft of the fuel injection equipment, said hydrostatic transmission including speed adjusting means operative to adjust the speed of the output shaft in accordance with a speed error signal;
   a plurality of receptacles for accumulating fuel discharged by each of a plurality of the fuel injectors;
   valve means for each of said receptacles for controlling the flow of fluid to the associated receptacle;
   a multi-mode control means comprising pulse generating means operative to generate a predetermined number of pulses per revolution of the shaft of the fuel injection equipment;
   counting means;
   speed mode control means including means for applying the pulses generated by the pulse generator to the counting means for preselected intervals, means for generating a speed error signal as a function of the difference between the number of pulses applied to the counting means in the preselected interval and a preselected count and means for resetting the counting means prior to each interval; and
   count mode control means including means for applying the pulses generated by the pulse generator to the counting means continuously until a preset count is accumulated, and means for opening the valve means to permit fuel from each of the fuel injectors to flow into the associated receptacle at the beginning of the count and for shutting off the valve means to discontinue the flow to the receptacles when the preset count is reached.

2. The apparatus of claim 2 including digital display means for displaying a digital count stored therein, and wherein the multi-mode control means includes tachometer mode control means comprising means for applying the pulses generated by the pulse generator to the counting means for predetermined intervals, means for applying the accumulated count to the display means at the end of each interval and means for resetting the counting means prior to each interval.

3. The apparatus of claim 2 wherein said count mode control means includes means for continuously applying the count accumulated in the counting means to the digital means.

4. The apparatus of claim 3 wherein the count mode control means also includes means for dividing down the pulses generated by the pulse generating means by the number of pulses generated by the pulse generating means per revolution of the pump shaft and means for applying the resultant pulses to the digital counting means whereby the digital display means will directly display the number of revolutions turned.

5. The apparatus of claim 2 including means to activate the tachometer mode control means and the speed mode control means simultaneously and wherein said preselected interval and said predetermined interval are the same interval.

6. The apparatus of claim 1 including means responsive to the accumulation of said preset count under control of the count mode control means to transfer control to said speed mode control means.

7. Apparatus for controlling a hydrostatic transmission having means responsive to a speed error signal for setting the speed of rotation of the output shaft thereof, comprising:
   pulse generating means operative to generate a predetermined number of pulses for each revolution of the output shaft of the hydrostatic transmission;
   digital counting means; and
   speed control means including means for applying the pulses generated by the pulse generating means to the digital counting means for preselected intervals, means responsive to the difference between the count accumulated in the counting means during the preselected intervals and a preselected count and operative to generate a pulsed speed error signal when said difference is less than a first count and operative to generate a continuous speed error signal when said difference exceeds the first count, and reset means for resetting the counting means at the end of each interval.

8. The apparatus of claim 7 wherein said reset means includes means for loading the preselected count into the counting means and for setting the counting means to count down at the end of each interval, wherein said means for applying the pulses generated by the pulse generating means to the counting means includes means for causing the counting means to reverse counting direction and count in the up direction when the count reaches zero during said preselected interval, and wherein said means responsive to the difference between the accumulated count and the preselected count includes means operative to generate a continuous speed error signal when the accumulated count remaining at the end of the preselected interval exceeds said first count, means operative to generate a speed error signal in the form of a pulse shorter in duration than the preselected interval when the accumulated count remaining is equal to or less than said first count but more than a second count, means operative to generate no speed error signal when the remaining count is equal to or less than the second count, and means operative for setting the polarity of the speed error signal to produce an increase in the speed of the hydrostatic transmission when the counting means does not reach zero during the preselected interval and to produce a decrease in speed when the counting means does reach zero.

9. The apparatus of claim 7 wherein said reset means includes means for loading the preselected count into the counting means and for setting the counting means to count down at the end of each preselected interval, wherein said means for applying the pulses generated by the pulse generating means to the counting means includes means for causing the counting means to reverse counting direction and count in the up direction when the count reaches zero during said preselected interval, and wherein said means responsive to the difference between the accumulated count and the preselected count includes additional counting means, means for resetting the additional counting means to zero at the end of each preselected interval, means responsive each time the count in the counting means reaches said first count while counting in either direction and each time the count in the counting means reaching a second count which is less than said first count while counting in either direction for applying a pulse to the additional counting means, and means responsvie to the count accumulated in the additional counting means during each interval for generating a continuous decrease speed error signal when a count of zero is accumulated in the additional counting means, means for generating a decrease speed error signal in the form of a pulse signal having a duration shorter than the preselected interval when a count of 1 is accumulated in the additional counting means, means for generating no speed error signal when a count of 2 is accumulated in the additional counting means, means for generating an increase speed error signal in the form of a pulse signal having a duration shorter than said preselected interval when a count of 3 is accumulated in the additional counting means and means for generating a continuous decrease speed error signal when a count of 4 is accumulated in the additional counting means.

10. Apparatus for providing multi-mode control of rotating equipment, comprising:
   a pulse generator operative to generate a predetermined number of pulses for each revolution of the rotating equipment;
   digital counting means;
   digital display means operative to generate a digital readout representative of a digital count stored therein;
   speed control means operative to control the speed of the rotating equipment in response to a speed error signal;
   count mode control means including means to continuously apply the pulses generated by the pulse generator to the counting means and means to continuously apply the accumulated count in the counting means to the digital display means;
   tachometer mode control means including means to apply the pulses generated by the pulse generator to the counting means for predetermined intervals, means for applying the accumulated count to the display means at the end of each interval, and means for resetting the counting means prior to each interval; and
   speed mode control means including means for applying the pulses generated by the pulse generator to the counting means for preselected intervals, means for generating a speed error signal as a function of the difference between the number of pulses applied to the counting means in the preselected interval and a preselected count and means for resetting the counting means prior to each interval.

11. The apparatus of claim 10 wherein the digital counting means includes a first digital counter and a second digital counter, and wherein the tachometer mode control means includes means for gating pulses to the first counter and the speed mode control means includes means for gating pulses to the second counter whereby both the tachometer mode and the speed mode can be selected simultaneously.

12. The apparatus of claim 10 wherein the reset means in the speed mode control means includes means for resetting the counting means to the preselected count prior to each interval, wherein the means for applying pulses to the counting means includes means for causing the counting means to count down from said preselected count in response to the applied pulses and wherein the speed error signal generating means includes means for generating an increase speed error signal when the count in the counting means does not reach zero by the end of the preselected interval and means for generating a decrease speed error signal when the count in the counting means does reach zero before the end of the preselected interval.

13. The apparatus of claim 12 wherein the means within the speed mode control means for applying pulses to the counting means includes means for causing the counting means to count the remaining pulses applied during an interval in the up direction when the count reaches zero before the end of an interval and wherein the speed error signal generating means includes means for generating a speed error signal having a first value when the count remaining at the end of the interval is less than a predetermined count and means for generating a speed error signal having a second value when the count remaining is equal to or more than the predetermined count.

14. The apparatus of claim 13 wherein the means for generating a speed error signal having a first value includes means for generating a signal having a duration which is less than the preselected interval and wherein the means for generating a speed error signal having a second value includes means for generating a signal having a duration at least as long as said predetermined interval.

15. The apparatus of claim 10 wherein the count mode control means includes means for dividing down the pulses generated by the pulse generating means by the number of pulses generated by the pulse generating means per revolution of the rotating equipment, and means for applying the resultant pulses to the digital counting means, whereby the digital display means will directly display the number of revolutions turned.

16. The apparatus of claim 10 wherein the predetermined interval during which pulses are applied to the counting means by the tachometer mode control means is equal to the unit of time selected for measuring the rate of rotation of the rotating apparatus divided by the predetermined number of pulses generated per revolution by the pulse generating means, whereby the count accumulated in the counting means at the end of the interval will be equal to the speed of rotation in the selected unit of measure and the digital display device will present a direct reading of the speed of rotation.

* * * * *